United States Patent [19]

Honnaker et al.

[11] 4,054,468
[45] Oct. 18, 1977

[54] PROCESS OF MAKING A LAMINATED SPINNERET

[75] Inventors: Leland Robert Honnaker, Wilmington, Del.; Gary Lee Jones, Midlothian; Walter Ernest Wood, both of Ridgeway, Va.

[73] Assignee: E. I. Du Pont de Nemours and Company, Wilmington, Del.

[21] Appl. No.: 720,849

[22] Filed: Sept. 7, 1976

[51] Int. Cl.² .............................................. D01D 3/00
[52] U.S. Cl. ............................. 148/11.5 Q; 148/20.3; 148/127
[58] Field of Search ............... 425/461, 464; 148/11.5 R, 11.5 Q, 13.1, 16.6, 20.3, 127; 75/174

[56] References Cited

U.S. PATENT DOCUMENTS

| 1,791,785 | 2/1931 | Austin | 425/464 |
|---|---|---|---|
| 2,965,924 | 12/1960 | Hull | 425/464 |
| 3,137,937 | 6/1964 | Cowan et al. | 228/108 |
| 3,210,451 | 10/1965 | Manning et al. | 425/464 X |
| 3,279,284 | 10/1966 | Ogden et al. | 76/107 |

FOREIGN PATENT DOCUMENTS

| 702,936 | 1/1954 | United Kingdom | 425/461 |

Primary Examiner—Robert D. Baldwin

[57] ABSTRACT

A corrosion-resistant spinneret, suitable for spinning filaments of poly(p-phenylene terephthalamide) from a viscous solution of the polymer in 98-100 percent sulfuric acid, is prepared from a plate of tantalum alloy or stainless steel which is clad on one face with a layer of pure tantalum. A spinneret blank is formed, counterbores are drilled through the plate and partially into the tantalum layer, the blank is annealed, spinneret capillaries are formed from the counterbores through the tantalum layer to the exit face of the spinneret, the face is polished to remove protrusions, and the face is hardened by heat-treatment in nitrogen. Uniform capillaries having a diameter of about 0.002 inch (0.05 mm) and a length greater than about 0.005 inch (0.13 mm) can be formed in spinnerets without breaking tools used in their production.

3 Claims, 2 Drawing Figures

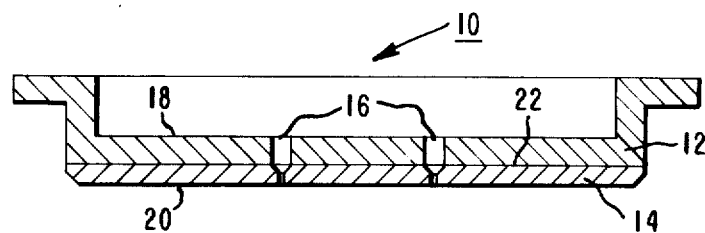
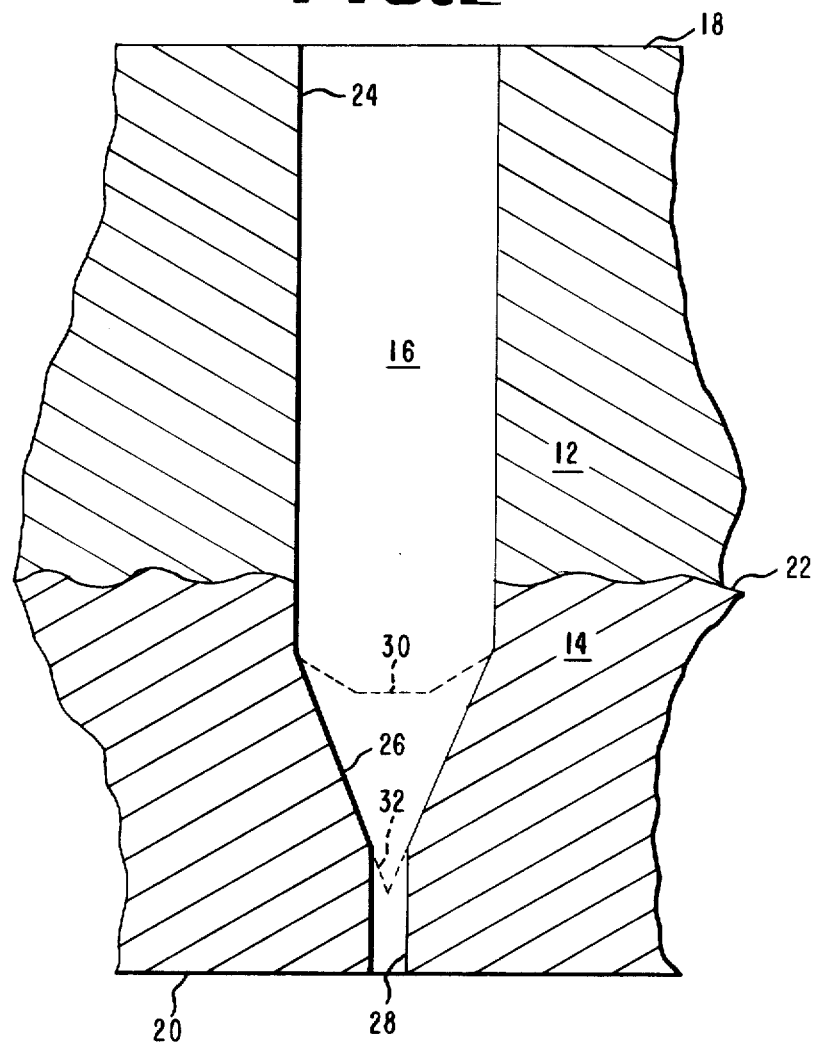

PROCESS OF MAKING A LAMINATED SPINNERET

BACKGROUND OF THE INVENTION

This invention relates to production of corrosion-resistant spinnerets and, in particular, to spinnerets suitable for spinning filaments of poly(p-phenylene terephthalamide) from a viscous solution of the polymer in 98 to 100 percent sulfuric acid.

Blades U.S. Pat. No. 3,767,756 discloses production of filaments having remarkably high tenacities from poly(p-phenylene terephthalamide) and related wholly aromatic polyamides (aramids) by spinning a viscous solution of the polymer in 98 to 100 percent sulfuric acid through spinneret capillaries 2 to 4 mils (0.05 to 0.10 mm) in diameter. Chlorosulfuric and fluorosulfuric acid are also disclosed as suitable solvents. When such highly corrosive solutions are extruded through filament-forming capillaries in spinnerets composed of customary materials, corrosion soon makes the spinnerets useless. An initial effect is that the originally sharp edges, defining the outlet peripheries of the capillaries, become dulled and rounded. This causes erratic non-uniformities of denier in the spun filaments, and threadline breaks occur at increasing frequency.

Tantalum has excellent corrosion resistance and has been proposed for spinnerets used in spinning rayon by the viscose process. Austin U.S. Pat. No. 1,791,785 teaches that tantalum is too hard for properly drilling spinneret holes unless it has been softened or annealed, but then the holes are likely to be deformed by subsequent use of the spinneret. Austin proposes coating the spinneret with an electrolytic film. British Pat. No. 702,936 mentions previous attempts to surface-harden completed tantalum spinnerets by heating them in air, oxygen, nitrogen or carbon monoxide, but states that such treatments impair the quality of the spinning passages to such an extent as to cause them to get rapidly blocked during spinning. Another difficulty with annealed tantalum is that it is a yield strength of less than 30,000 pounds per square inch and an elongation of at least 20 percent, i.e., is quite ductile. Particularly for the present purpose, an excessively thick tantalum spinneret would be required to avoid bulging at the high spinning pressures used. Optimum fiber properties are also difficult to obtain because of the length of spinning passages through a thick spinneret.

Hull U.S. Pat. No. 2,965,924 proposes forming spinneret holes in thin sheet metal, which may be a noble metal, drilling holes in a corresponding pattern in a spinneret blank, plating the blank with copper or silver, assembling the punched sheet metal with the plated blank, and brazing the assembly together. There are several difficulties with this procedure. (1) Precise alignment of holes produced in the separate parts is too difficult. (2) Excess of the copper or silver brazing metal can partially or completely block spinneret capillaries. (3) Deformation of the assembly occurs during brazing. (4) Discontinuities in the brazing metal allow leakage to occur between the sheet metal and the blank. Ogden et al. U.S. Pat. No. 3,279,284 proposes avoiding the use of brazing metal by instantaneous welding, e.g., explosively bonding the parts together by detonating a sheet of explosive material. However, adequate bonding in this manner inevitably causes some deformation of the relatively soft face layer containing the spinneret capillaries; repolishing the face to a flat surface then introduces non-uniformities in the lengths of the spinneret capillaries which cause objectionable denier variations in the filaments produced.

SUMMARY OF THE INVENTION

The present invention provides a laminated spinneret and process of making it which avoid the indicated difficulties with previous corrosion-resistant spinnerets. Spinnerets can be prepared that are suitable for spinning filaments of poly(p-phenylene terephthalamide) from viscous solutions of the polymer in 98 to 100 percent sulfuric acid, have excellent resistance to corrosion, and have uniform spinneret capillaries which have improved resistance to dulling and rounding of the outlet peripheries.

Preferred embodiments of the invention comprise the process steps of a. machining a laminate, consisting of a plate of tantalum alloy or stainless steel clad on one face with a layer of commercially pure tantalum, to form a spinneret blank wherein the area of the blank which is to contain spinneret orifices has parallel flat faces, is of a thickness sufficient to prevent bulging of the spinneret face at spinning pressures, and has an exit face layer of tantalum about 0.025 to 0.04 inch (0.6–1.0 mm) thick, b. drilling a counterbore through the plate and partially into the tantalum layer at the location of each spinneret orifice, c. forming a conically tapering section at the bottom of each counterbore, d. wrapping the spinneret blank in tantalum metal foil and heat-treating the blank in vacuum at about 1,800° to 2,000° F (980°–1,100° C) to provide a soft-annealed tantalum layer, e. forming an axially aligned spinneret capillary, of about 3 to 12 square mils (0.002–0.008 mm$^2$) in cross-sectional area, from the tip of each conical taper through the tantalum layer to the exit face of the spinneret blank, f. polishing the exit face of the spinneret to remove protrusions formed by the punching operations, and g. heat-treating the spinneret in nitrogen at about 1,600° to 1,700° F (870°–930° C) to harden the face.

Spinneret capillaries of any desired cross-section can be formed in step (e). Capillaries having a diameter of about 2 to 4 mils (0.05–0.10 mm) and a length at least about 2.5 times the diameter are generally preferred.

The tantalum-clad plate used to form the spinneret blank in step (a) is prepared by known methods of welding one metal to another by a thin transition layer composed of a mixture of the two metals. The weld is preferably achieved by explosive bonding as disclosed in Cowen et al. U.S. Pat. No. 3,137,937. The laminate preferably consists of a layer of commercially pure tantalum explosively bonded onto a plate of tantalum alloyed with 2 to 3 percent of tungsten based on the weight of tantalum.

The invention also comprehends spinnerets wherein the exit face layer is an alloy of gold or platinum, although such noble metal alloys are much more expensive than tantalum. The corrosion-resistant spinneret may comprise a backer plate of tantalum alloy or stainless steel, an exit-face layer of a material selected from commercially pure tantalum, a gold-platinum alloy, a gold-platinum-rhodium alloy, a gold-platinum-rhenium alloy, and a gold-rhodium alloy, the exit face being about 0.025 o 0.04 inch (0.06–1.0 mm) thick and being bonded to the backer plate by a relatively thin transition layer composed of a mixture of the metals used in the backer plate and exit-face layer, a counterbore extending through the backer plate and partially into the exit-face layer, a conically tapering section at the bottom of the counterbore, a spinneret capillary extending through the exit-face layer from the conically tapering section, the cross-sectional area of the capillary being about 3 to 12 square mils (0.002–0.008 mm²) and substantially less than that of the counterbore, and the length of the capillary being greater than about 5 mils (0.13 mm).

Preferably the tantalum alloy or stainless steel of the backer plate is characterized by having an annealed yield strength of at least 80,000 pounds per square inch (5,625 kg/cm²), an elongation of at least 10 percent, and a corrosion rate of less than 1 mil (0.025 mm) per year in sulfuric acid.

Preferably the commercially pure tantalum or gold alloy of the face layer is characterized by having an annealed yield strength of less than 30,000 pounds per square inch (2,110 kg/cm²), an elongation of at least 20 percent, and a corrosion rate of less than 1 mil (0.025 mm) per year in sulfuric acid.

BRIEF DESCRIPTION OF THE DRAWINGS

FIG. 1 is a vertical cross-sectional view of a round, cup-shaped spinneret embodiment of this invention.

FIG. 2 is a greatly enlarged cross-sectional view of a portion of FIG. 1 which includes a single spinning passage.

DETAILED DESCRIPTION

Spinneret 10 is composed of a backer plate 12 and an exit-face layer 14. The backer plate is made of tantalum alloy or stainlesss steel. The exit-face layer is preferably made of commercially pure tantalum but may be a noble metal alloy. As shown in FIG. 2, the face layer has been explosively bonded to the backer plate, producing a wave-like interface 22 where the metals have intermixed. Spinning passages 16 extend from entrance face 18 to exit face 20 of the spinneret. The two faces are flat and parallel. There will usually be many more spinning passages than those shown. A spinning passage includes a cylindrical counterbore 24 drilled through the backer plate and partially into the face layer as indicated by the dashed line 30, a conical taper 26 formed by punching into the bottom of the counterbore to a depth indicated by dashed line 32, and a spinneret capillary 28 formed through the remaining thickness of the face layer. The capillary shown has a length of about three times its diameter. The face layer 14 must be thick enough to accommodate all of conical taper 26 and capillary 28; it is typically of the order of 0.025 to 0.04 inch (0.6–1.0 mm) in thickness. The thickness of the backing plate in the area having spinning passages is ordinarily somewhat greater than that of the face layer, but is preferably no thicker than is sufficient to prevent bulging of the spinneret face at spinning pressures which will be experienced in use.

Spinnerets of this invention are particularly useful for spinning polyamide filaments of unusually high tenacity as disclosed in Blades U.S. Pat. No. 3,767,756. The process requires the use of highly corrosive solvents such as 98% sulfuric acid, chlorosulfuric acid, fluorosulfuric acid, and their mixtures. Moreover, the rheology of the polymer solutions is such that preferred tensile properties are obtained when using spinning capillaries of small diameter (D) and high length-to-diameter ratios (L/D). Typical capillary diameters are 2 to 4 mils (0.05 to 0.10 mm) at L/D ratios of at least about 2.5. Preferably the diameter of the counterbore is from 6 to 12 or more times the diameter of the spinning capillary, and the length of the counterbore (including the conical taper joining the counterbore to the spinning capillary) is about 2 to 8 times the diameter of the counterbore. These sizes, coupled with the high flow viscosities, require high extrusion pressures.

The laminated spinneret for this purpose may be of the plate, disc, or flat-bottomed cup type having spinning capillaries of round or non-round cross-section which intersect the exit face perpendicularly. The backer plate is composed of metal having an annealed yield strength at a 0.2% offset of at least 80,000 psi (5,625 kg/cm²), an elongation at one inch (2.54 cm) gage length of not less than 10%, and a corrosion rate not greater than 1.0 mil/year (0.025 mm/yr). The exit-face layer is composed of a metal having an annealed yield strength at 0.2% offset of less than 30,000 psi (2,110 kg/cm²), an elongation at one inch (2.54 cm) gage length of not less than 20%, and a corrosion rate not greater than 1.0 mil/year (0.025 mm/year). Tensile strength in pounds per square inch (psi) and percent elongation are determined according to ASTM Standard E8-69 using the Rectangular Tension Test Specimen. The corrosion rate is determined by the 168-hour immersion test according to ASTM Standard G31-72, using concentrations of sulfuric acid up to 100% at temperatures from 0° to 100° C.

The preferred material for the backer plate is tantalum alloyed with 2 to 3 percent of tungsten. Alloys of this type which also contain a grain refining agent such as niobium are less desirable because machining is more difficult. Alloys of tantalum containing up to 15 percent by weight of tungsten may be used but are difficult to machine, and counterbore drilling results in high tool wear. Stainless steels having the required yield strength, elongation, and corrosion resistance may also be employed.

The preferred material for the exit-face layer is commercially pure tantalum. After cladding, its yield strength will exceed 30,000 psi. (2,110 kg/cm²) and the formation of high L/D spinning capillaries is not feasible commercially. When it is annealed while wrapped in tantalum foil at about 1,800° F (982° C) under vacuum, however, its yield strength is reduced to below 30,000 psi (2,110 kg/cm²), and high L/D spinning capillaries can be formed with care on a commercial basis. Because its yield strength is close to 30,000 psi, the exit-face layer also contributes to the resistance of the spinneret to deformation under pressure. Moreover, its surface can be superficially hardened so as to better resist scratches during use by heating in a nitrogen atmosphere at about 890° C for sufficient time (ordinarily about 1 hour).

Other materials than tantalum can be used for the cladding layer so long as they have the required corrosion resistance and annealed yield strengths of less than 30,000 psi (2,110 kg/cm²). Among such suitable materials, listed in order of increasing hardness, are gold, M-metal (90% gold/10% rhodium by weight), C-metal (69.5% gold/30% platinum/0.5% rhodium by weight), D-metal (59.9% gold/40.0% platinum/0.1% rhenium by weight), and Z-metal (50.0% gold/49.0% platinum/1.0% rhodium by weight). The latter was substantially the same hardness as tantalum. Also suitable is a 75% gold/25% platinum alloy. All of these metals are, however, much more expensive than tantalum. All but Z-metal are much more easily damaged in use than tantalum. Softer materials are advantageous, however, when capillaries of quite high L/D ratio (e.g., greater than 3.5) are to be formed.

Explosive bonding is preferably achieved as taught by Cowan et al. in U.S. Pat. No. 3,137,937. The two ductile metal layers to be bonded are arranged to be parallel and separated by at least 1 mil (0.025 mm), an explosive having a detonating velocity greater than 1,200 m/sec but less than 120% of sonic velocity is placed uniformly over one outside surface, and the detonation is propagated parallel to the layers starting at one edge of the explosive-bearing layer. A continuous metallurgical bond results at the interface characterized by a wave-like intermixing of the two metals.

Some plastic deformation of the laminae is an inevitable result of explosive bonding. Therefore, as a minimum, machining the laminate requires grinding and polishing of the exit and entrance faces to render them flat and parallel. Precise machining of the periphery to form the shape and size of a spinneret blank is also normally required. Frequently, machining involves converting the laminate to a cup-shaped spinneret blank of the type illustrated in FIG. 1.

In the area of the spinning blank selected for formation of spinning passages, a counterbore for each spinning passage is drilled in known fashion. Initial tapers with relatively large included angles may also be drilled at this stage. Each of the resulting holes would extend a uniform distance from the entrance face of the spinneret blank to a depth at which the generally horizontal bottom surfaces of the hole are completely within the cladding layer. The final taper (smallest included angle) is then formed by punching at the bottom of each hole. If the drilled hole does not extend into the cladding layer, punching of the final taper coins metal from the backer plate along the walls of the taper, thus hardening the walls and causing breakage of punches subsequently used to form spinning capillaries. Should any of these operations produce protuberances on the exit face, the exit face should be polished to flatness before proceeding.

Before spinning capillaries are formed in the cladded facing metal, the spinneret blank should be softened by annealing in order to minimize breakage of formation tools. The material of the cladding layer should have an annealed yield strength of less than 30,000 psi (2,110 kg/cm$^2$) to avoid breaking formation tools, particularly when forming capillaries having L/D values of at least about 2.5. Time and temperature conditions for annealing the cladding materials are well known. When the preferred tantalum is annealed in the presence of oxygen, hard oxidized and discolored surfaces result. To avoid these drawbacks, a spinneret blank with a tantalum cladding layer is first wrapped tightly in tantalum metal foil and then annealed in a vacuum at about 1,800° F (982° C). A spinning capillary of any desired cross-sectional shape is formed in the annealed blank through the remaining thickness of cladding layer at the bottom of each hole. The exit face is then polished to remove protrusions formed.

Formation of spinneret capillaries is accomplished with a formation tool, i.e., an elongated punch-like tool having at its tip a small extension longer than but of precisely the same cross-section as the desired capillary. The extension of the formation tool is pushed through the thickness of spinneret plate remaining between its exit face and the bottom of a preformed counterbore hole. This operation is akin to punching and is often referred to as such.

The softer the material of the cladding layer, the more readily it is damaged in handling. Thus, the completed spinneret should be hardened to the extent possible. For most materials this involves heating to a temperature close to the annealing temperature followed by slow cooling in known fashion. Tantalum is preferably surface hardened by heating in a nitrogen atmosphere at 890° C for about 1 hour.

We claim:

1. In the production of a corrosion-resistant spinneret suitable for spinning filaments of poly(p-phenylene terephthalamide) from a viscous solution of the polymer in 98 to 100 percent sulfuric acid, the process steps which comprise
   a. machining a laminate, consisting of a plate of tantalum alloy or stainless steel clad on one face with a layer of commercially pure tantalum, to form a spinneret blank wherein the area of the blank which is to contain spinneret orifices has parallel flat faces, is of a thickness sufficient to prevent bulging of the spinneret face at spinning pressures, and has an exit face layer of tantalum about 0.025 to 0.04 inch thick,
   b. drilling a counterbore through the plate and partially into the tantalum layer at the location of each spinneret orifice,
   c. forming a conically tapering section at the bottom of each counterbore,
   d. wrapping the spinneret blank in tantalum metal foil and heat-treating the blank in vacuum at about 1,800° to 2,000° F to provide a soft-annealed tantalum layer,
   e. forming an axially aligned spinneret capillary, of about 3 to 12 square mils in cross-sectional area, from the tip of each conical taper through the tantalum layer to the exit face of the spinneret blank,
   f. polishing the exit face of the spinneret to remove protrusions formed by the capillary forming operations, and
   g. heat-treating the spinneret in nitrogen at about 1,600° to 1,700° F to harden the face.

2. A process as defined in claim 1 wherein spinneret capillaries of a diameter of about 2 to 4 mils and a length of at least about 2.5 times the diameter are formed in step (e).

3. A process as defined in claim 1 wherein said laminate consists of a layer of commercially pure tantalum explosively bonded onto a plate of tantalum alloyed with 2 to 3 percent of tungsten based on the weight of tantalum.

* * * * *